US008486585B2

United States Patent
Strutt et al.

(10) Patent No.: US 8,486,585 B2
(45) Date of Patent: *Jul. 16, 2013

(54) ELECTRODE ASSEMBLY FOR A SOLID OXIDE FUEL CELL AND METHOD FOR MAKING THE SAME

(76) Inventors: Peter R. Strutt, Storrs, CT (US); Bernard H. Kear, Whitehouse Station, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/465,616

(22) Filed: May 7, 2012

(65) Prior Publication Data

US 2012/0225373 A1   Sep. 6, 2012

Related U.S. Application Data

(63) Continuation of application No. 11/999,775, filed on Dec. 7, 2007, now Pat. No. 8,173,327.

(60) Provisional application No. 60/874,574, filed on Dec. 13, 2006.

(51) Int. Cl.
*H01M 4/02* (2006.01)

(52) U.S. Cl.
USPC ........... 429/533; 429/532; 429/468; 429/452; 429/466

(58) Field of Classification Search
USPC .................. 429/532, 533, 468, 452, 466
See application file for complete search history.

(56) References Cited

U.S. PATENT DOCUMENTS

| | | | |
|---|---|---|---|
| 3,885,977 A | 5/1975 | Lachman et al. | |
| 4,675,302 A | 6/1987 | Roy et al. | |
| 5,916,706 A | 6/1999 | Berkey et al. | |
| 6,025,084 A * | 2/2000 | Kawasaki et al. | 429/456 |
| 6,372,375 B1 * | 4/2002 | Lawless | 429/486 |
| 6,423,436 B1 | 7/2002 | George et al. | |
| 6,589,627 B1 | 7/2003 | Nakanishi et al. | |
| 6,989,119 B2 | 1/2006 | Bernas et al. | |
| 7,037,875 B2 | 5/2006 | Hu et al. | |
| 7,083,842 B2 | 8/2006 | Masukawa et al. | |

(Continued)

FOREIGN PATENT DOCUMENTS

| | | |
|---|---|---|
| EP | 1452511 | 9/2004 |
| EP | 2109907 | 9/2010 |

OTHER PUBLICATIONS

Du, Yanhai et al., "Fabrication and Properties of Anode-Supported Tubular Solid Oxide Fuel Cells", Journal of Power Sources, vol. 136, 2004, pp. 66-71.

(Continued)

*Primary Examiner* — Zachary Best
(74) *Attorney, Agent, or Firm* — Troy S. Kleckley; Troutman Sanders LLP

(57) ABSTRACT

An electrode assembly for a solid oxide fuel cell, the electrode assembly including a porous ceramic oxide matrix and an array of fluid conduits. The porous ceramic oxide matrix includes a labyrinth of reinforcing walls interconnected to one another. Each of the fluid conduits is formed from the porous ceramic oxide matrix and has an external surface with a plurality of struts projecting outwardly therefrom and an internal surface defining a first passage for flowing a first fluid therethrough. The struts are configured to connect the fluid conduits to one another and the external surfaces and the struts define a second passage around the fluid conduits for flowing a second fluid therethrough.

12 Claims, 16 Drawing Sheets

U.S. PATENT DOCUMENTS

| | | | |
|---|---|---|---|
| 8,173,327 B2 | 5/2012 | Strutt et al. | |
| 2002/0020298 A1* | 2/2002 | Drost et al. | 96/11 |
| 2004/0183055 A1 | 9/2004 | Chartier et al. | |
| 2005/0037252 A1 | 2/2005 | Pham | |
| 2005/0118482 A1* | 6/2005 | Sriramulu et al. | 429/34 |
| 2005/0214613 A1* | 9/2005 | Sarkar et al. | 429/31 |
| 2005/0244693 A1 | 11/2005 | Strutt et al. | |

OTHER PUBLICATIONS

Sammes, N.M. et al., "Design and Fabrication of a 100 W Anode Supported Micro-Tubular SOFC Stack", Journal of Power Sources, vol. 145, 2005, pp. 428-434.

Agraflotis, Christos et al., "The Effect of Powder Characteristics on Washcoat Quality. Part I: Alumina Washcoats", Journal of the European Ceramic Society, vol. 20, 2000, pp. 815-824.

Agraflotis, Christos et al., "The Effect of Power Characteristics on Washcoat Quality. Part II: Zirconia, Titania Washcoats-Multilayered Structures", Journal of the European Ceramic Society, vol. 20, 2000, pp. 825-834.

Izuhara, S. et al., "Highly Porous Cordierite Ceramics Fabricated by in Situ Solidification", Proceeding of 7th International Conference on Ceramic Processing Science, Ceramic Transactions, vol. 112, 2000, pp. 553-558.

Heinrich, T. et al., "Synthesis and Properties of Mullite and Cordierite Aerogels", Journal of Sol-Gel Science and Technology, vol. 2, 1994, pp. 921-924.

Sleight, Arthur, "Zero-Expansion Plan", Nature Publishing Group, vol. 425, Oct. 16, 2003, pp. 674-676.

Annex to Form PCT/ISA/206, Communication Relating to the Results of the Partial International Search dated Jul. 24, 2008 for related PCT Application No. PCT/US2007/025123.

International Search Report dated Dec. 15, 2008 for related PCT Application No. PCT/US2007/025123.

Roy, Rustum et al., "Very Low Thermal Expansion Coefficient Materials", Annu. Rev. Mater. Sci. 1989,19: pp. 59-81.

Dejneka, Matthew J. et al., "Strong, Low Thermal Expansion Niobate Ceramics", J. Am. Ceram. Soc., 2011, 94 [8] pp. 2249-2261.

Parker, Fred J., "Al2TiO5-ZrTiO4-ZrO2 Composites: A New Family of Low-Thermal-Expansion Ceramics", J. Am. Ceram. Soc., 1990, 73 [4] pp. 929-932.

* cited by examiner

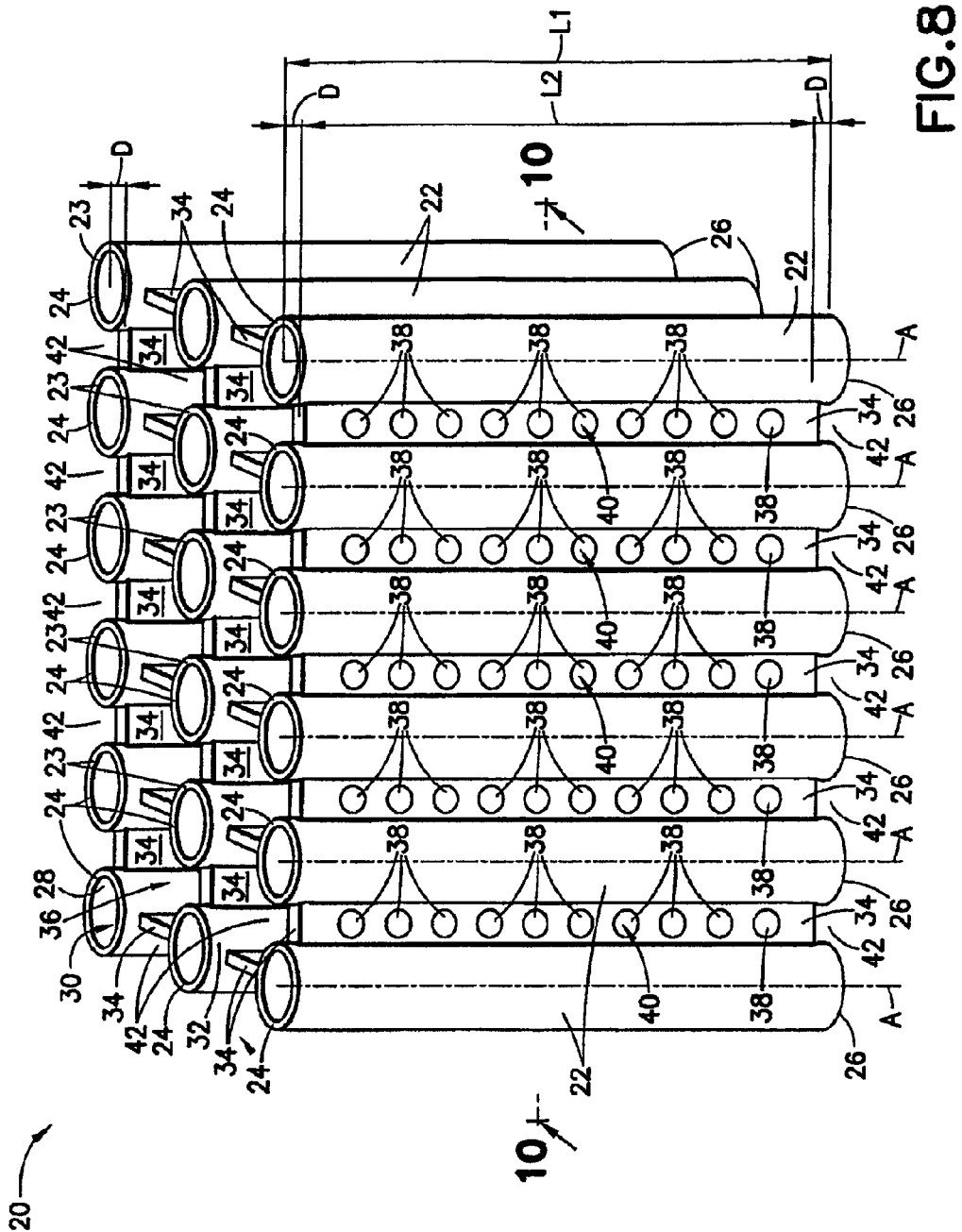

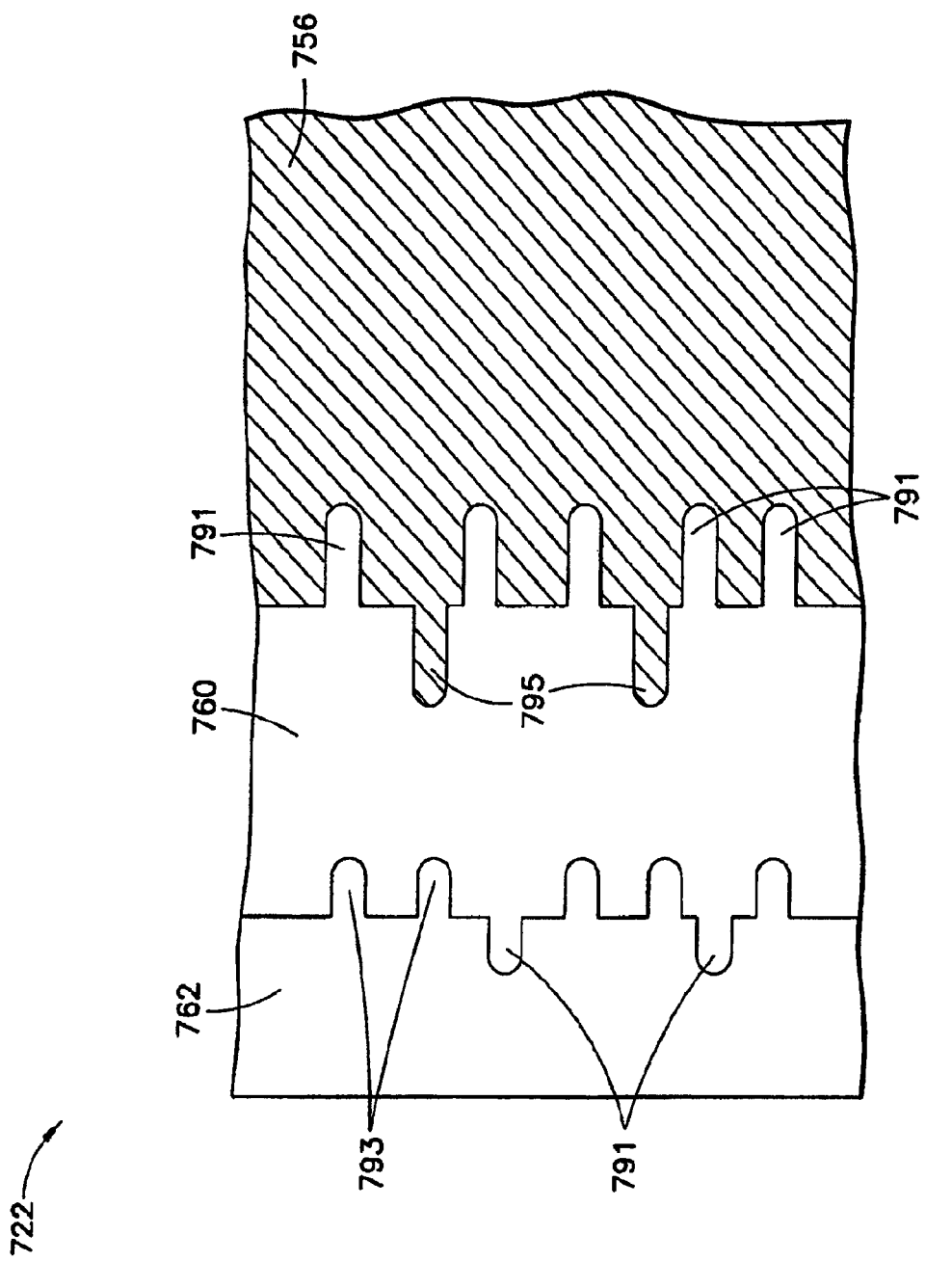

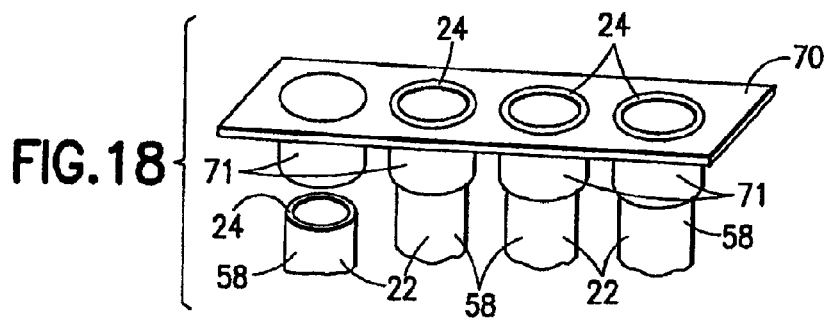
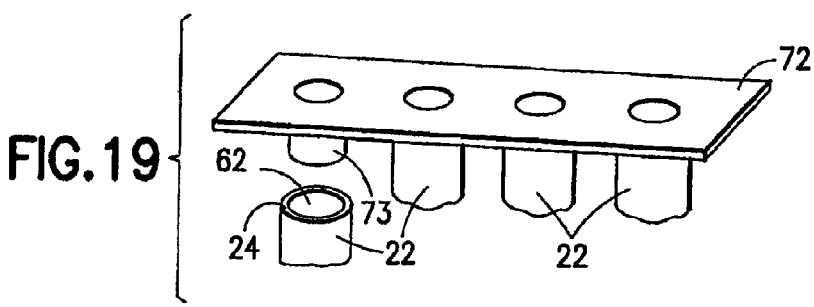
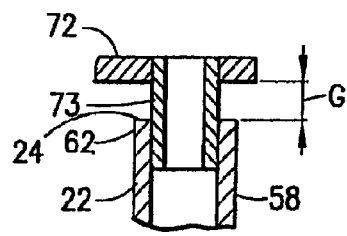
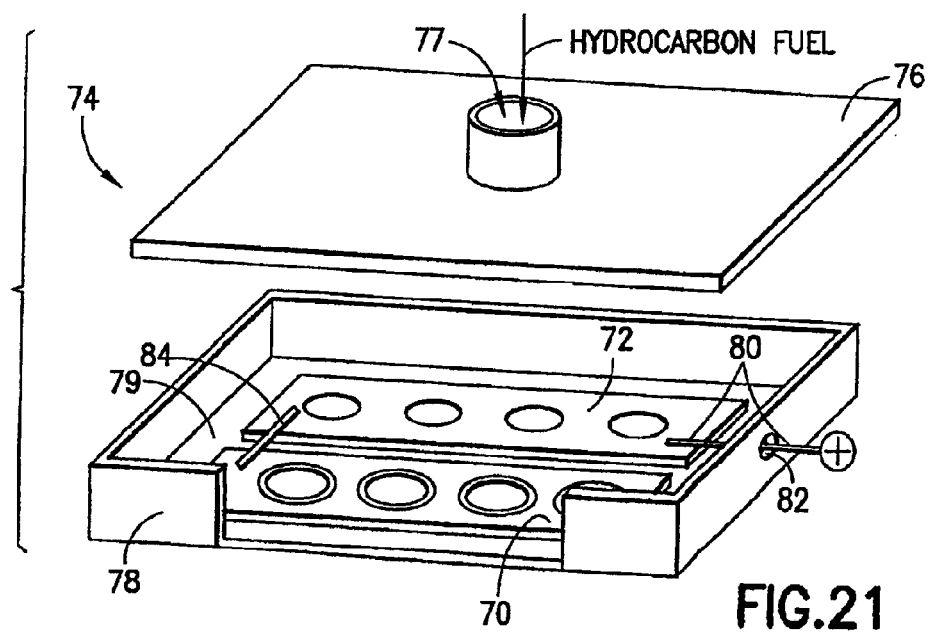

ELECTRODE ASSEMBLY FOR A SOLID OXIDE FUEL CELL AND METHOD FOR MAKING THE SAME

CROSS-REFERENCE TO RELATED APPLICATIONS

This application is a continuation application of, and claims priority to, U.S. patent application Ser. No. 11/999,775, filed on Dec. 7, 2007, now U.S. Pat. No. 8,173,327, which claims priority from provisional application Ser. No. 60/874,574, filed Dec. 13, 2006, the entireties of both of which are incorporated by reference herein as if fully set forth below. This application is related to commonly owned and copending U.S. Patent Application Publication No. 2005/0244693, filed Apr. 30, 2004, entitled "Metastable Ceramic Fuel Cell and Method of Making the Same," the disclosures of which are incorporated by reference herein, in their entireties.

FIELD OF THE INVENTION

The present invention is generally directed to an electrode assembly for a solid oxide fuel cell capable of electrochemically processing a fuel and oxygen to generate electricity and is more specifically directed to an array of interconnected fluid conduits made from a thermal shock resistant porous ceramic oxide matrix having a near zero coefficient of thermal expansion.

BACKGROUND OF THE INVENTION

Fuel cells are electrochemical devices that process fuel and oxygen to produce electricity and heat. Fuel cells include electrodes having an anode, a cathode and an electrolyte therebetween. Fuel cells can be provided in planar and/or tubular forms. Planar fuel cells can be stacked to form piles of cells. Tubular fuel cells can be arranged in multi-tube planar arrays which can then be stacked one upon another. However, sealing between each of the planar arrays and structural supporting of the tubular fuel cells relative to one another can be problematic. Solid Oxide Fuel Cells (SOFC) operate at temperatures in the range of 900 to 1000 degrees Celsius and thus can be subject to severe thermal transients. SOFCs use hard and brittle ceramic compounds at least for the electrolyte. Such ceramic materials have poor thermal shock resistance. Although, tubular electrodes can be designed to be more resistant to thermal shock than their planar counterparts, prior art multi-tubular SOFC stacks can also be susceptible to thermal shock induced wear and reduced life, for the reasons mentioned above.

Referring to FIG. 1, a prior art multi-tube array of tubular fuel cells for a Solid Oxide Fuel Cell assembly (SOFC) is generally indicated by element number 900, wherein the array includes a plurality of tubular fuel cells 910 each having a fuel inlet 912 and a fuel outlet 914, secured within a housing 916. N. M. Sammes, Y. Du, and R. Bove, Journal of Power Sources 145, (2005), 428-434. An air passage 918 is defined between the tubes 910 for flowing air from an air inlet 920 to an air outlet 922.

Referring to FIGS. 2 and 3, in the prior art, adjacent tubular fuel cells 910 are connected to one another by respective current collectors 924 which each have a female connector 926 and male connector 928 projecting therefrom. The female connectors 926 are brazed onto an outer surface 930 of each of the tubular fuel cells 910 and the male connectors 928 are brazed onto an inner surface (not shown) of each of the tubular fuel cells 910. N. M. Sammes, Y. Du, and R. Bove, Journal of Power Sources 145, (2005), 428-434. Such an arrangement can be susceptible to thermal distortion because of the limited restraint provided between adjacent tubular fuel cells 910 by the current collectors 924.

Prior art multi-tubular SOFC stacks generally utilize individual tubular fuel cells manufactured in relatively expensive piece-part operations. Assembly of multi-tubular SOFC stacks, which utilize prior art individual fuel cells, is also complex, quite expensive and time consuming because of the multitude of parts which must be fit and attached to one another.

Material selection for SOFCs is difficult because of the high operating temperatures and thermal shock which they are subject to. However, Cordierite ($2MgO2Al_2-5SiO_2$) is known to display very low thermal expansion over wide temperature ranges and thus demonstrates excellent thermal shock resistance. U.S. Pat. No. 3,885,977, to Lachman et al. It is also known that cordierite honeycomb structures are used in automotive applications as a structural body and catalyst carrier. U.S. Pat. No. 6,589,627, to Nakanishi et al. As noted by A. Sleight in Nature Vol. 425 (2003), pp 674-676, cordierite has a hexagonal structure, in which thermal expansion along two axes is compensated for by the opposite sign of thermal expansion along a third axis.

U.S. Pat. No. 7,037,875 discloses a support for a catalyst for controlling vehicular exhaust emissions comprising a high surface area refractory metal oxide, e.g., gamma-alumina, having a monomolecular layer of a second oxide selected from the group consisting of titanium dioxide, cerium dioxide and zirconium dioxide. The support may be converted into a vehicular exhaust emission control catalyst by depositing the support on a substrate such as cordierite. Also, surface modification of cordierite by alumina, titania, and zirconia "wash-coating" is reported by C. Agrafiotis and A. Tsetsekou in Journal of European Ceramic Society 20, (2000), 815-824, and 20, (2000), 825-834. In addition, the prior art teaches methods for processing cordierite material in a variety of forms, with a porosity of 70 percent or more. S. Izuhara, K. Kawasumi, and M. Yasuda, Ceramic Transactions 112, (2000), 553-558. T. Heinrich, W. Tappert, W. Lenhard, and J. Fricke in Journal of Sol-Gel Science and Technology 2, (1994), 921-924, report on the processing and properties of a cordierite aerogel.

Thus there is a need to provide tubular fuel cell assemblies that are resistant to thermal shock and distortion, are simple and inexpensive to manufacture and assemble and that have an extended useful life compared to that of prior art fuel cells. Prior art apparatuses, methods and systems for addressing these needs are either too expensive, too complicated, ineffective or a combination of all of these. Based on the foregoing, it is the general object of the present invention to improve upon prior art tubular fuel cell assemblies and methods and overcome the problems and drawbacks thereof.

SUMMARY OF THE INVENTION

One aspect of the present invention includes an electrode assembly for a solid oxide fuel cell, the electrode assembly includes a porous ceramic oxide matrix and an array of fluid conduits formed from the porous ceramic oxide matrix. Each of the fluid conduits has an external surface with a plurality of struts projecting outwardly therefrom and an internal surface defining a first passage for flowing a first fluid therethrough. The struts are configured to connect the fluid conduits to one another and the external surfaces and the struts define a second passage around the fluid conduits for flowing a second fluid therethrough.

In another aspect of the present invention, the porous ceramic oxide matrix has a diffusion barrier coated thereon for inhibiting migration of atoms from the porous ceramic oxide matrix. The diffusion barrier has an electrically conductive coating applied thereto. Each of the fluid conduits includes a cathode material embedded in at least a portion of the porous ceramic oxide matrix thereby forming a cathode composite material. In addition an electrolyte layer is formed on the cathode composite material and an anode layer is formed on the electrolyte layer.

In another aspect of the present invention, the porous ceramic oxide matrix has a porosity of about 50 percent to about 70 percent. To improve resistance to thermal shock, a material with a near zero coefficient of thermal expansion is used for the porous ceramic oxide matrix. Materials with a coefficient of thermal expansion of about zero to about $3 \times 10^{-6}/^\circ K$ such as cordierite, are used.

In another aspect of the present invention, a method for making an array of fluid conduits for a SOFC is disclosed. In particular a method for making a porous ceramic matrix which contains a porosity of about 50 percent to about 70 percent, by volume is disclosed. The method includes the step of providing a die for forming the array the fluid conduits. The die is configured to provide each of the fluid conduits with an external surface with a plurality of struts projecting outwardly therefrom and an internal surface defining a first passage therethrough. The method includes the step of providing a suspension of a nanopowder, a surfactant, a monomer and a gelation agent such as a polymeric binder. The method further includes the steps of mixing the suspension, extruding the suspension through the die to form an intermediate phase of the array of fluid conduits. The fluid conduits are connected to one another by the struts and the struts and the external surface define a second passage. The intermediate phase is then air dried and subsequently heated to about 500 degrees Celsius to about 1000 degrees Celsius to form the array of fluid conduits made of a solid porous ceramic oxide matrix.

BRIEF DESCRIPTION OF DRAWINGS

FIG. 8 illustrates the array of FIG. 4 after a finishing operation.

FIG. 17 is an enlarged view of a portion of FIG. 13.

FIG. 18 is a perspective view of a female manifold interconnect strip.

FIG. 19 is a perspective view of a male manifold interconnect strip.

FIG. 20 is a cross sectional view of a portion of the male manifold interconnect strip of FIG. 18.

FIG. 21 is an exploded view of a manifold assembly.

DETAILED DESCRIPTION OF THE PREFERRED EMBODIMENT

Figure 1:
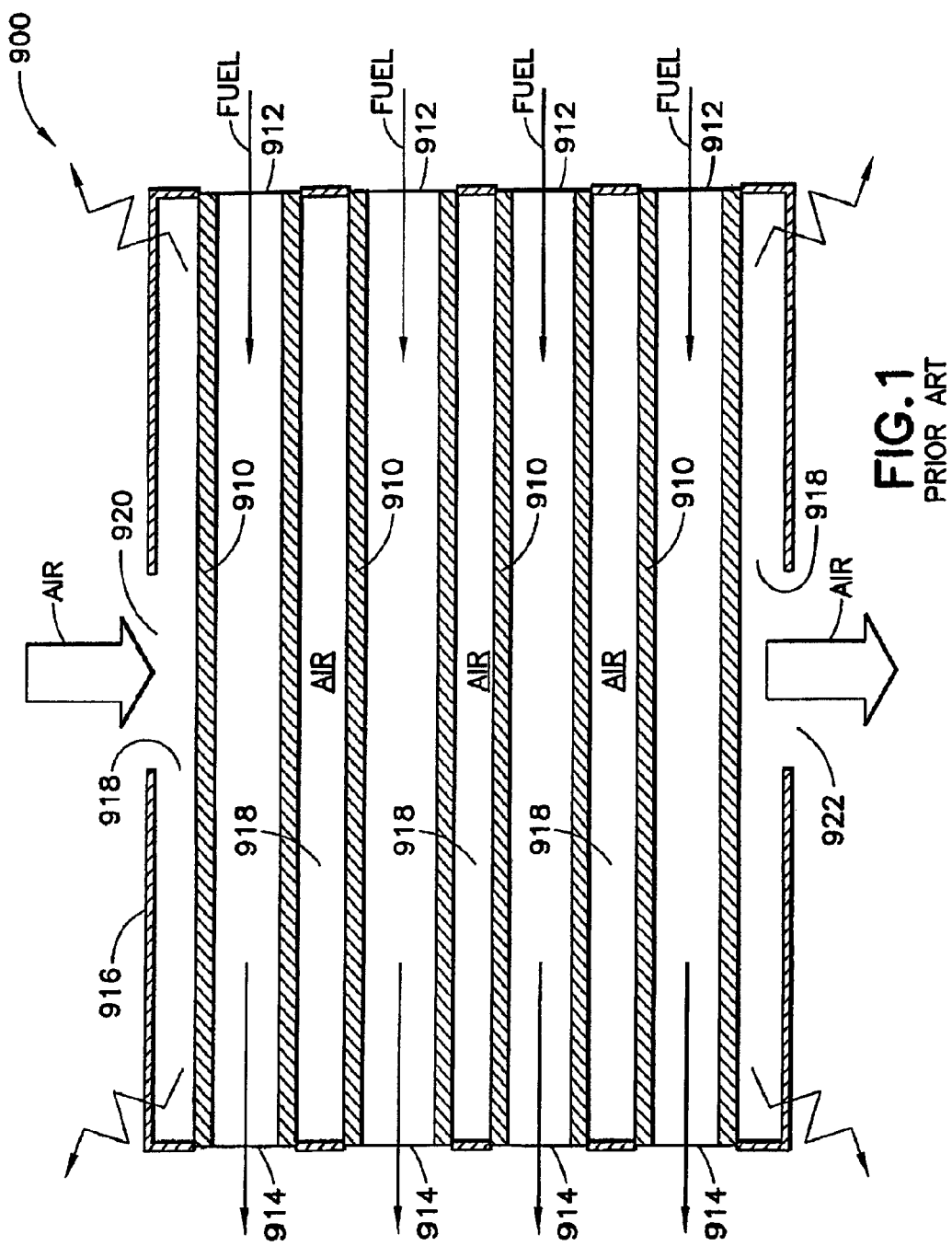
FIG. 1 is a schematic cross sectional view of a prior art multi-tube planar array of tubular fuel cells for a solid oxide fuel cell.
Figure 2:
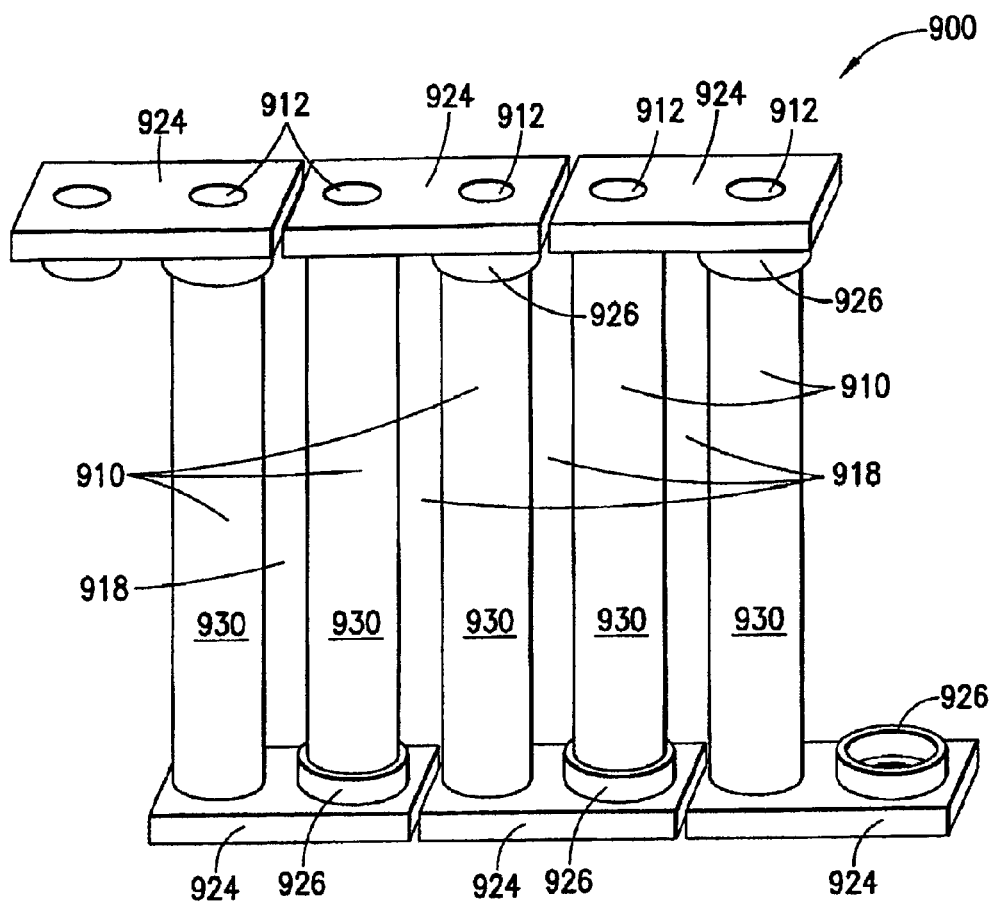
FIG. 2 is a perspective view of the prior art multi-tube planar array of FIG. 1.
Figure 3:
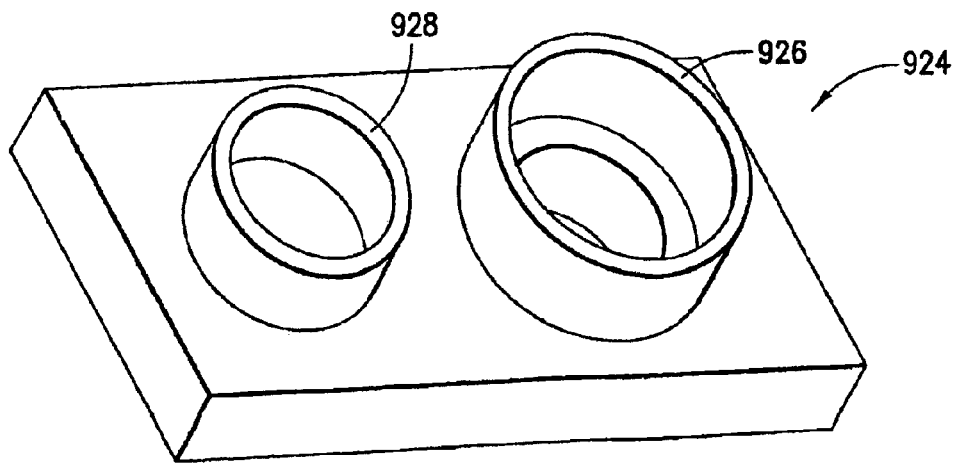
FIG. 3 is a perspective view of a prior art current collector of FIG. 2.
Figure 4:
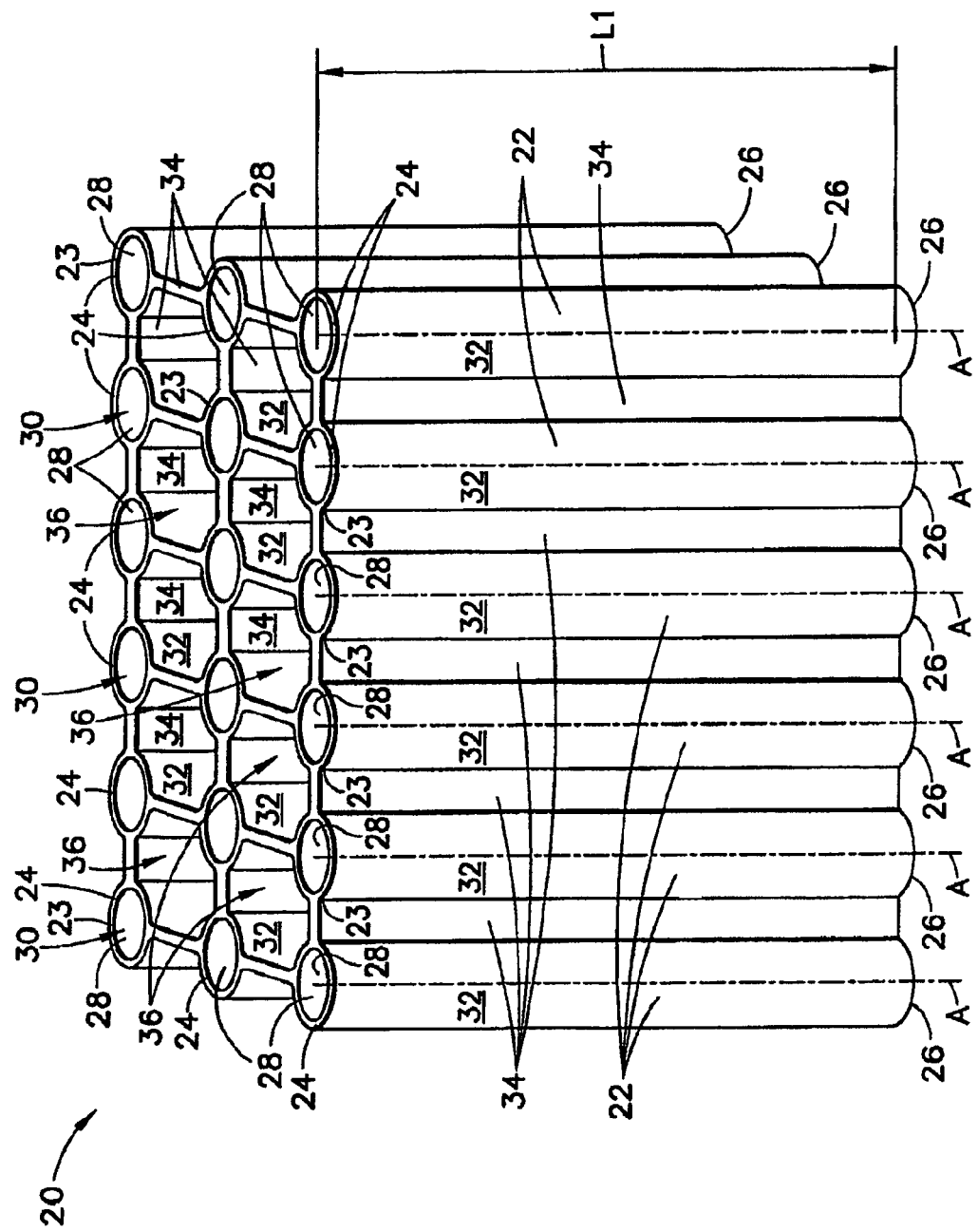
FIG. 4 is a perspective view of an array of fluid conduits in accordance with the teachings of the present invention.

FIG. 4 illustrates an array of fluid conduits, indicated generally at 20, for use in a solid oxide fuel cell and for processing fuel and oxygen to generate electricity therefrom. The array 20 is shown having eighteen substantially tubular fluid conduits 22 arranged in three rows of six. The fluid conduits 22 have tube-like walls 23 formed from a porous ceramic matrix, as described in detail below. The fluid conduits 22 each have an inlet end 24, an outlet end 26, a longitudinal axis A and a length L1 along the longitudinal axis. The fluid conduits 22 are spaced apart from one another and are aligned with their respective longitudinal axes A, substantially parallel to one another. Each of the tube-like walls 23 has an internal surface 28 which, in combination with coatings applied thereto and described below, defines a first passage 30 for flowing the fuel therethrough, from the inlet end 24 to the outlet end 26. Each of the tube-like walls 23 also has an external surface 32 with struts 34 projecting outwardly therefrom and extending longitudinally along the external surface substantially over the length L1. The struts 34 are also formed of the porous ceramic matrix described below. The struts 34 are arranged orthogonal to one another and connect adjacent fluid conduits 22 to one another, to provide structural integrity to the array 20 and to resist distortion when the array is subject to applied loads such as those due to thermal transients. The struts 34 cooperate with the external surfaces 32 to define a second passage 36 around the fluid conduits 22, for flowing the oxygen therethrough.

The array 20 is manufactured by an extrusion process to facilitate mass production of multiple tubes, in a common operation. The array 20 is three dimensional with the tube-like walls 23 and the struts 34 formed contiguous with one another. Because the array 20 has adjacent fluid conduits 22 connected to one another, there is no need to stack separate multi-tube planar arrays to one another. Because the struts 34 and the tube-like walls 23 are continuous with each other, the need for separate supports and fixtures to secure the struts to the fluid conduits is eliminated. In addition, the array 20 is formed into the porous ceramic matrix, by the extrusion process and subsequent heat treatment steps, for improved thermal shock resistance, as discussed in detail below.

Figure 7:
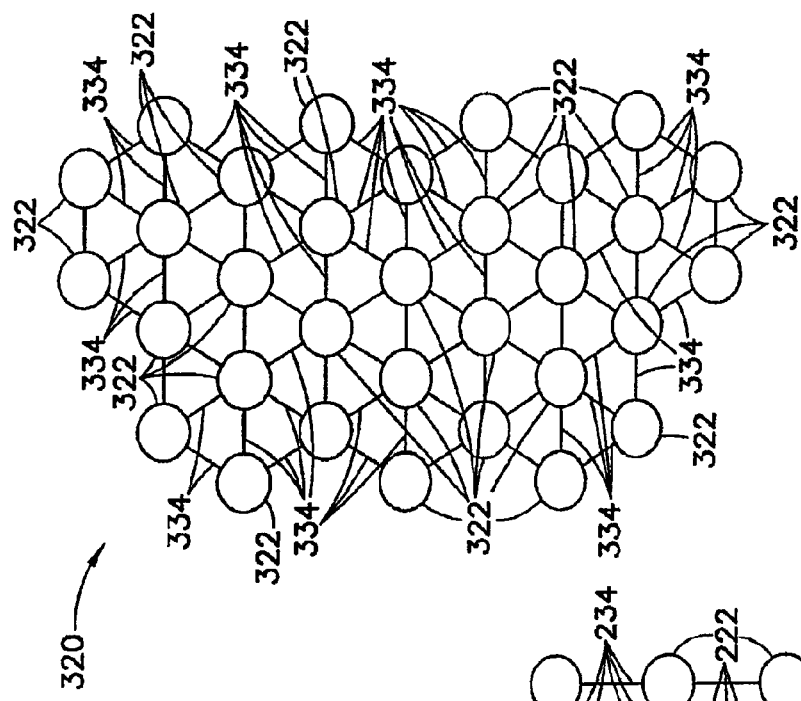
FIG. 7 is the array of FIG. 5 with an additional fluid conduit centrally disposed within a group of six fluid conduits.
Figure 6:
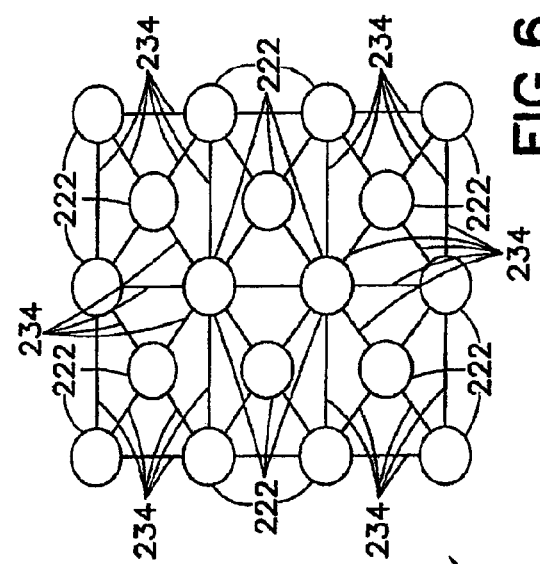
FIG. 6 is a cross sectional view of an array of fluid conduits arranged orthogonally with an additional fluid conduit centrally disposed between a group of four fluid conduits.
Figure 5:
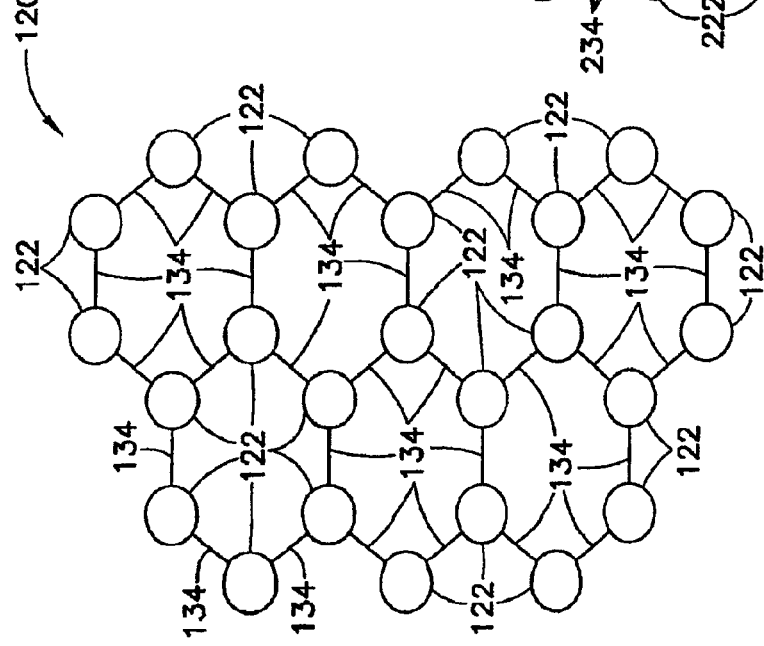
FIG. 5 is a cross sectional view of an array of fluid conduits arranged hexagonally.

Although, the array 20 is shown with eighteen fluid conduits 22, the present invention is not limited in this regard as any number of fluid conduits can be formed into such an array. In addition, while the struts 34 of FIG. 4 are said to be arranged orthogonally, the present invention is not limited in this regard as other configurations are also suitable. For example, referring to FIGS. 5-7, various geometric configurations for arrays are illustrated, similar to the array of FIG. 4. Therefore, like elements will be given like numbers preceded by the numerals 1, 2 and 3, for FIGS. 5, 6, and 7, respectively. For example, the array 120 of FIG. 5 illustrates a hexagonal arrangement of fluid conduits 122 connected to adjacent fluid conduits by struts 134; the array 220 of FIG. 6 illustrates a fluid conduit 222 centrally disposed between a set of four other fluid conduits with adjacent fluid conduits connected to one another by struts 234; and the array 320 of FIG. 7 illustrates a fluid conduit 322 centrally disposed between a set of six hexagonally arranged fluid conduits, with adjacent fluid conduits connected to one another by struts 334.

Referring to FIG. 8, the array 20 illustrates ten substantially circular ports 38 formed in each of the struts 34 visible in FIG. 8. The remaining struts 34 which are not visible in FIG. 8 also have similar ports formed therein. The ports 38 cooperate with the second passage 36 to facilitate cross-flow of the oxygen across the fluid conduits 22 in the direction indicated by arrows 40. In addition, a portion of each of the struts 34 adjacent to the inlet end 24 and outlet end 26, respectively, of each of the fluid conduits 22, is removed by a suitable operation thereby forming recesses 42 between adjacent fluid conduits 22. The recesses 42 are shown having a depth D. As discussed below, the recesses 42 allow a manifold to be fit on the array 20 for distribution of the fuel to each of the fluid conduits 22, for sealing a portion of the second passage 36 and for providing electrically conductive communication between the fluid conduits. While ten substantially circular ports 38 are described, the present invention is not limited in this regard, as any number of ports in any configuration including but not limited to rectilinear configurations are also suitable. Although cross-flow of the oxygen across the fluid conduits 22 is shown in the direction indicated by arrows 40, the present invention is not limited in this regard as any suitable flow path through the ports 38 and the second passage 36 is also adaptable to be used in the present invention.

Figure 9:
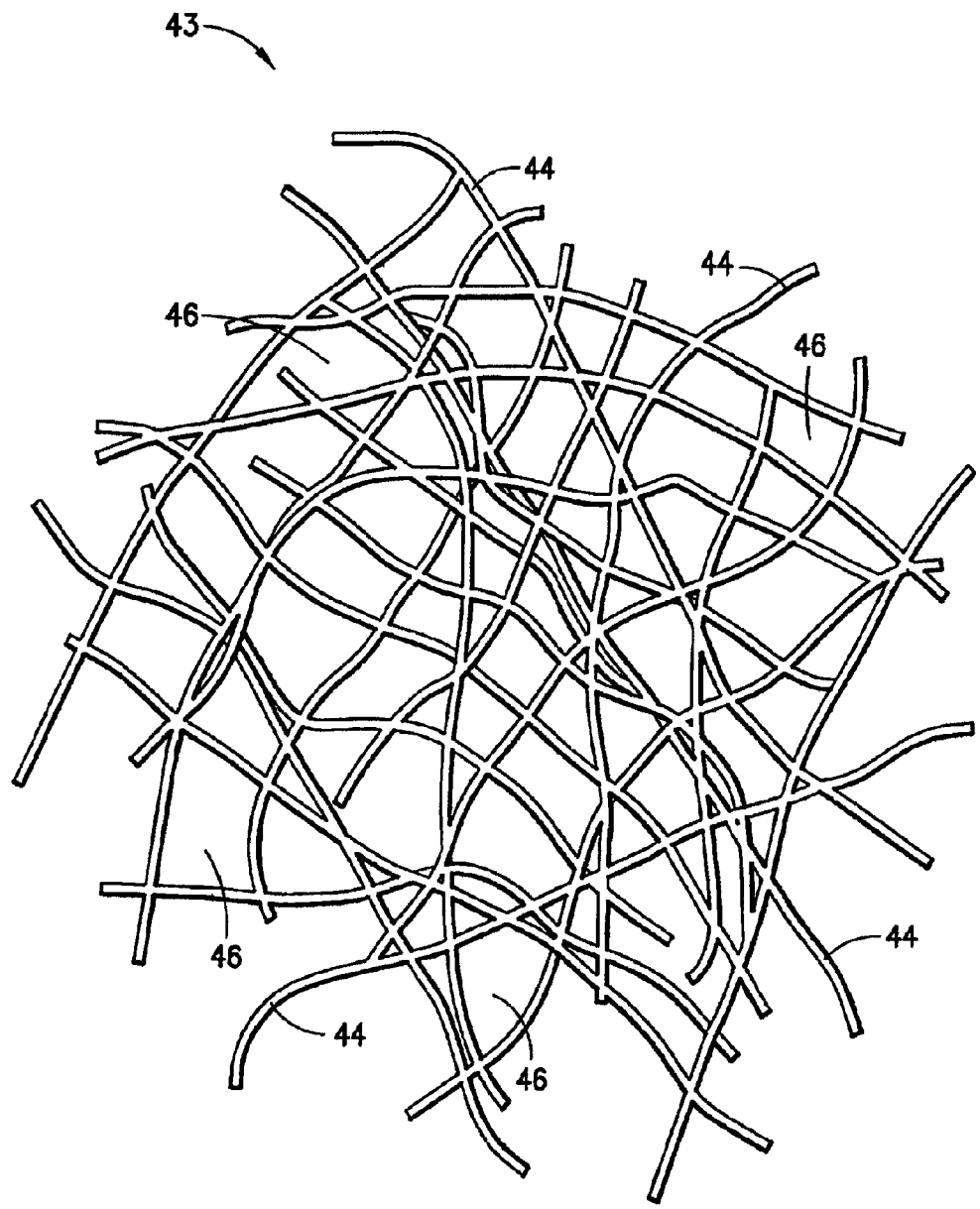
FIG. 9 is a schematic view of a porous ceramic matrix.

Referring to FIG. 9, the porous ceramic matrix of the tube-like walls 23 and the struts 34 is indicated by element number 43. The porous ceramic matrix 43 includes a labyrinth of reinforcing strips (or walls) 44 defining a plurality of cavities 46 therebetween. In one embodiment, the strips 44 are interconnected to one another. The cavities 46 consume about 50 percent to about 70 percent, by volume, of the tube-like walls 23 and the struts 34. In one embodiment, the cavities 46 are mirco-porous each about 0.5 microns to about 25 microns in diameter. In another embodiment, the cavities 46 are nano-porous each about 5 nanometers to about 500 nanometers. In addition, the porous ceramic matrix 43 is an electrical insulator. In one embodiment, the porous ceramic matrix 43 has a near zero coefficient of thermal expansion of about zero to about $3 \times 10^{-6}/^\circ K$, to provide resistance to thermal shock and distortions such as those caused by thermal transients and thermal gradients. In one embodiment, the porous ceramic matrix 43 is cordierite, $2MgO.2Al_2O_3.5SiO_2$ ($Mg_2Al_4Si_5O_{18}$).

Figure 10:
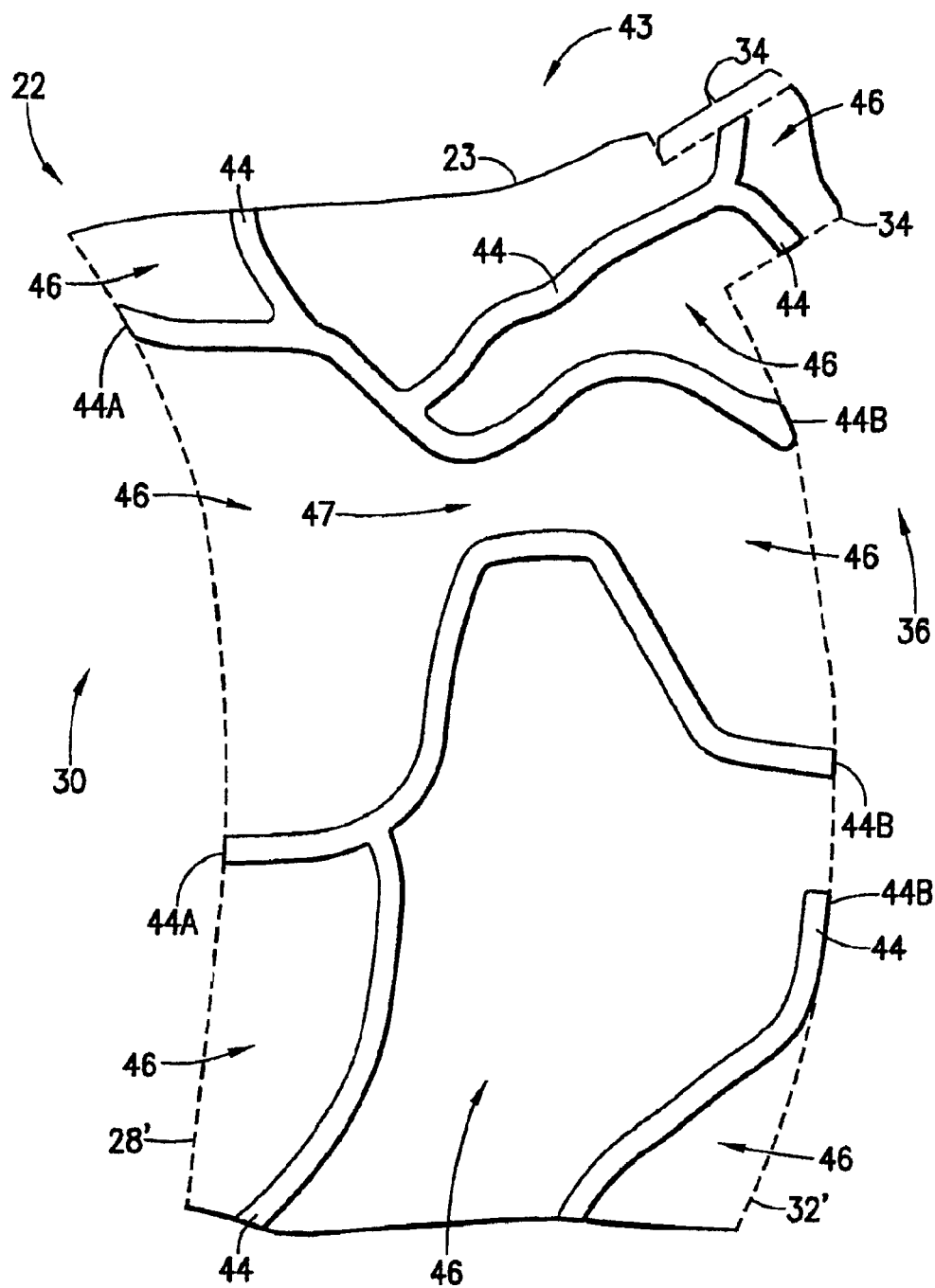
FIG. 10 is a schematic illustrating an enlarged view of a thin cross section of a portion of a fluid conduit of FIG. 8.

Referring to FIG. 10, the strips 44 are illustrated interconnected to one another within the tube-like wall 23 and the strut 34. The strips 44 are shown with a first set of strip edges 44A abutting a first curved dashed line 28' which generally follows the contour of the internal surface 28 illustrated in FIG. 4 and a second set of strip edges 44B abutting a second curved dashed line 32' which generally follows the contour of at least a portion of the external surface 32 illustrated in FIG. 4. The cavities 46 are in fluid communication with the first passage 30 and the second passage 36. Two cavities 46 are shown interconnected to each other at a juncture 47. In one embodiment the cavities 46 are contiguous and interconnected to one another throughout the porous ceramic matrix 43. The contiguous configuration of the cavities 46 facilitates infusion of additives such as those for providing a diffusion barrier and electrically conductive nano-particles of about 2 nanometers to about 100 nanometers. In one embodiment the electrically conductive particles are about 2 nanometers to about 10 nanometers. The electrically conductive particles enhance electrically conductivity, as described below.

Figure 11:
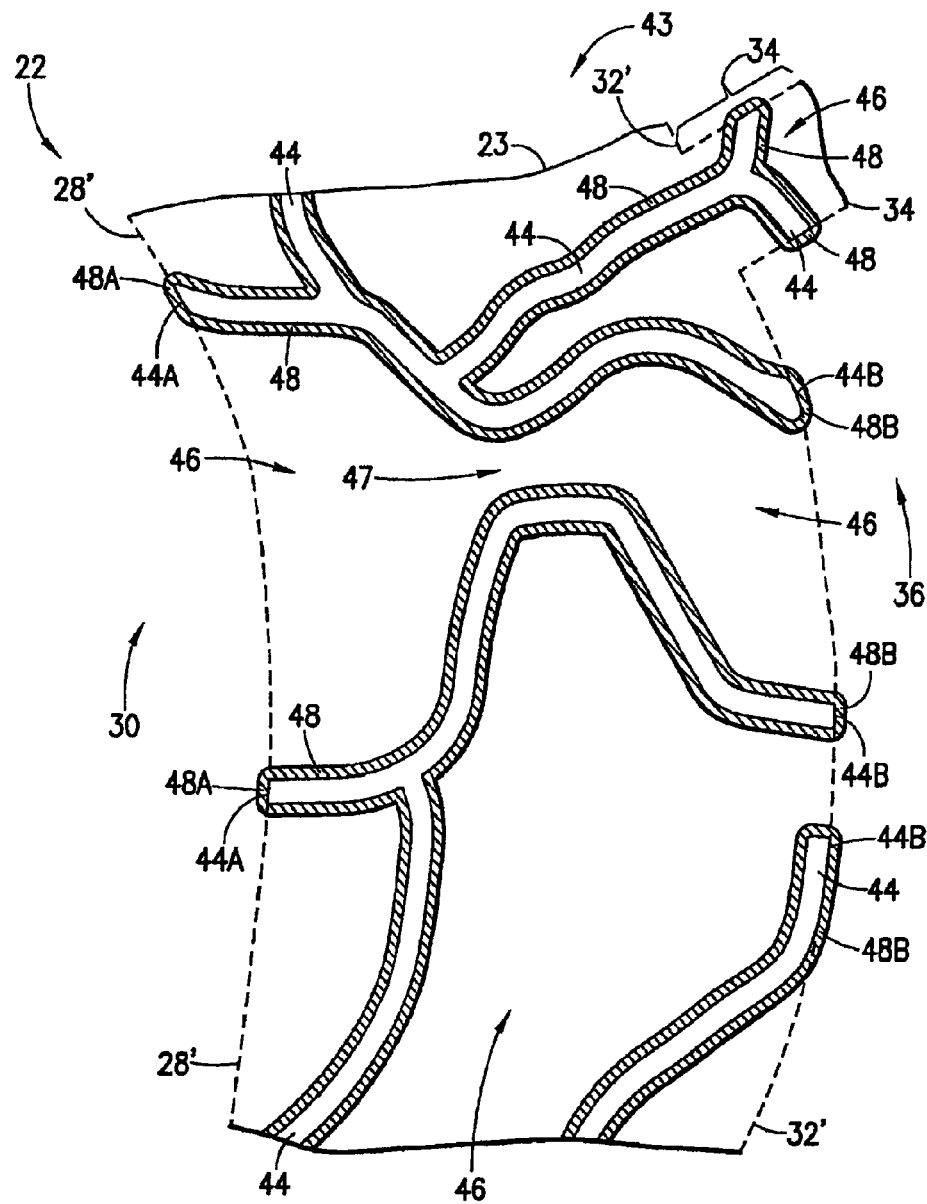
FIG. 11 is an illustration of the portion of the fluid conduit of FIG. 10 having a diffusion barrier coated thereon.

Referring to FIG. 11, the porous ceramic matrix 43 includes the diffusion barrier 48, 48A and 48B of alumina coated on the strips 44 and the strip edges 44A and 44B, respectively to inhibit diffusion of silicon atoms from the porous ceramic matrix 43 thereby minimizing the potential for degradation of an electrically conductive layer, an anode and a cathode, as described in detail below. The diffusion barrier 48 also coats the strips 44 within and on the strut 34. The diffusion barrier 48, 48A and 48B is applied by wash coating the porous ceramic matrix 43 thereby forming a layer of about 0.2 microns to about 10 micron thick. In one embodiment, the diffusion layer is about 0.2 microns to about 0.5 microns thick. In one embodiment the entire array 20 is wash coated with the alumina. While an alumina coating has been described for the diffusion barriers 48, 48A and 48B, the present invention is not limited in this regard, as other materials are suitable for diffusion barriers, including but not limited to zirconia and titania.

Figure 12:
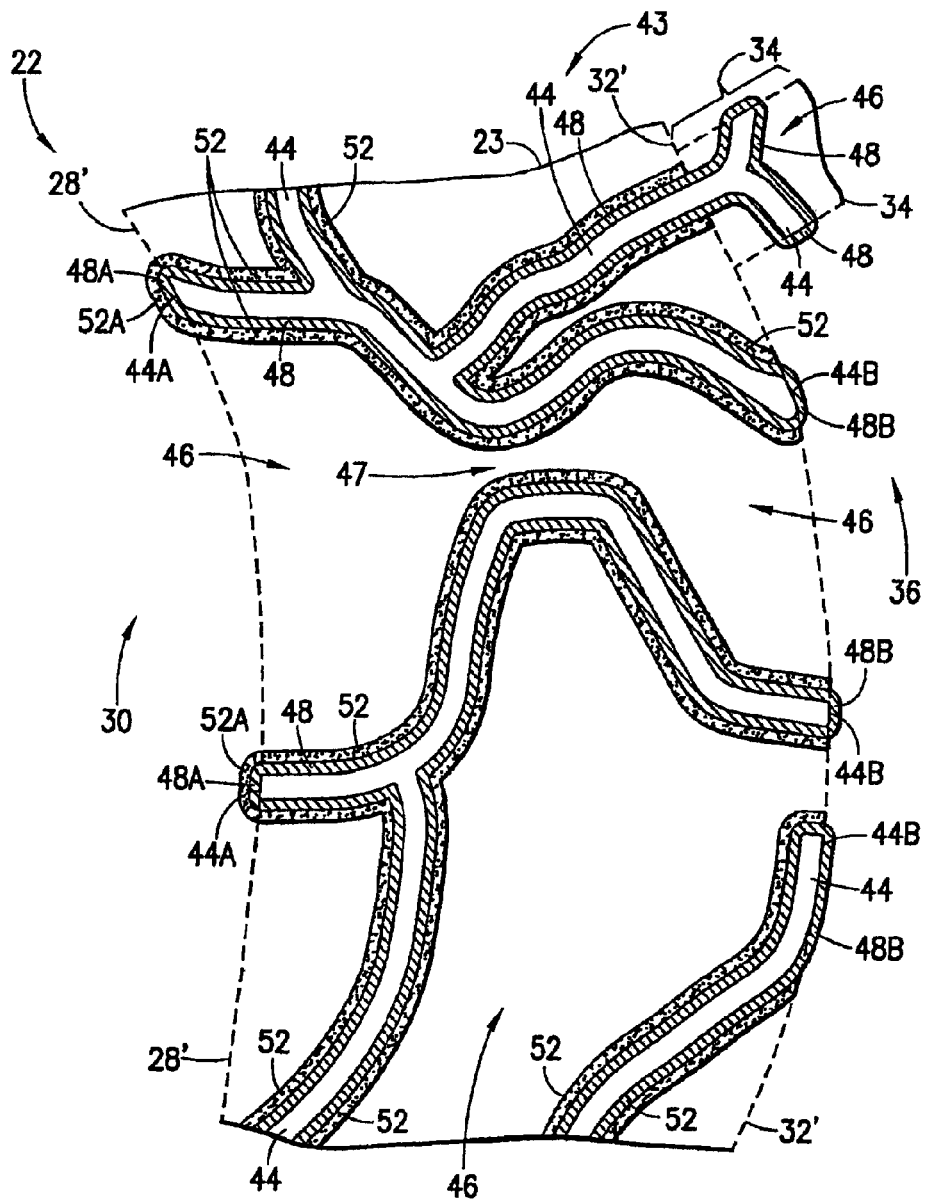
FIG. 12 is an illustration of the portion of the fluid conduit of FIG. 11 having electrically conductive nano-particles coated thereon.

FIG. 12 illustrates the fluid conduit 22 with electrically conductive layers 52 and 52A of the electrically conductive nano-particles 54 applied to the diffusion barriers 48 and 48A, respectively. The electrically conductive layers 52 and 52A are about 5 nm to about 50 nm thick. In one embodiment, the electrically conductive nano-particles 54 are silver nano-particles. The electrically conductive layers 52 and 52A provide electrical current collection and electron transport through the tube-like walls 23. As described below, the electrically conductive nano-particles 54 are injected into the first passage 30 and are caused to percolate through the internal surface 28 and into the cavities 46, until the electrically conductive nano-particles begin to emerge at the external surface 32. An insignificant amount of or no electrically conductive nano-particles 54 crosses or cross a boundary defined by the second curved dashed line '32. Therefore the diffusion barriers 48 on and within the strut 34 have an insignificant amount of or no electrically conductive nano-particles 54 applied thereto, such that the struts 34 electrically insulate the fluid conduits 22 from one another. While silver nano-particles are described for use as the electrically conductive layer 52 and 52A, the present invention is not limited in this regard as any suitable electrically conductive particles can be used, including but not limited to nickel nano-particles.

Figure 13:
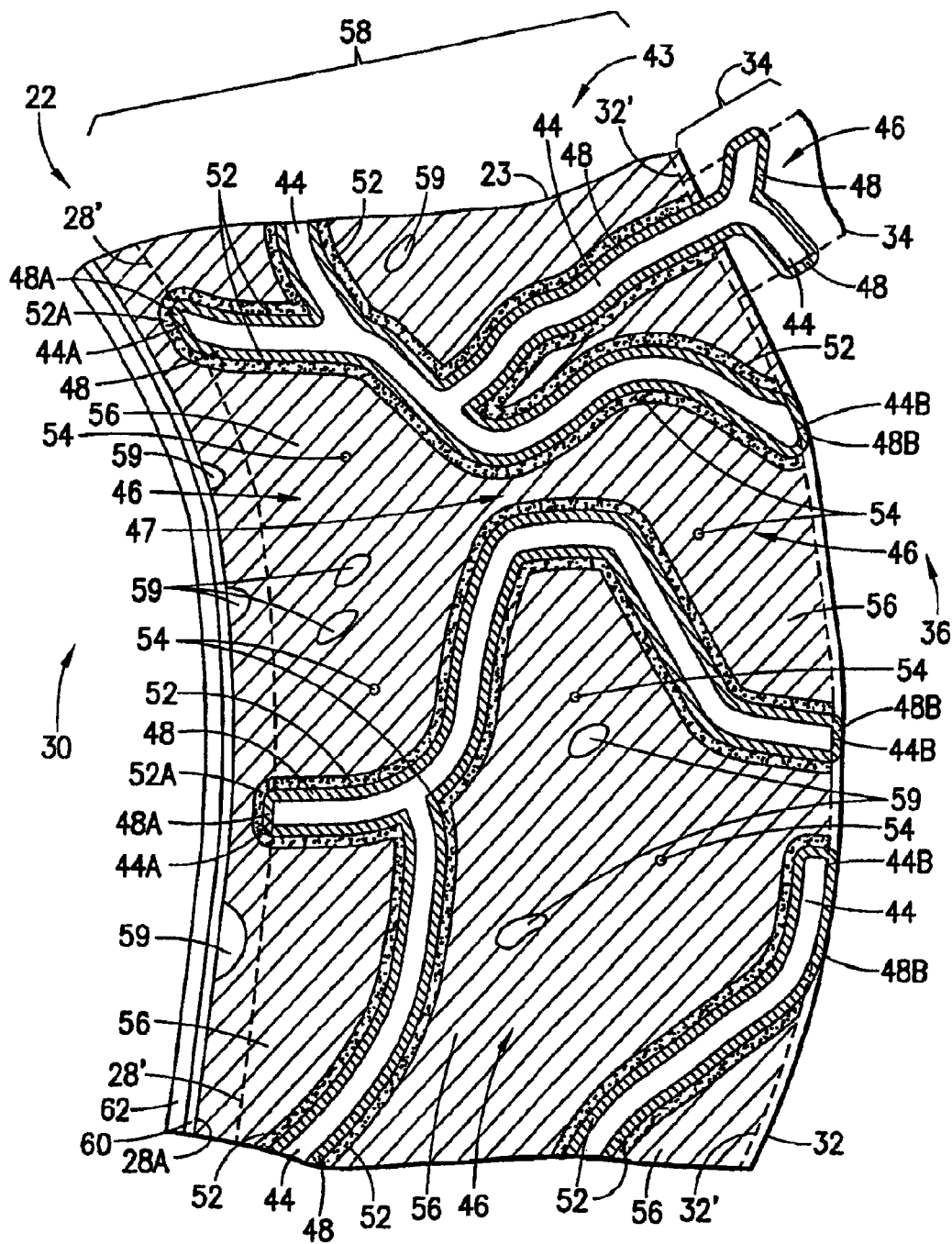
FIG. 13 is an illustration of the portion of the fluid conduit of FIG. 12 having a composite cathode, an electrolyte and an anode.

FIG. 13 illustrates a cathode material 56 permeated throughout the porous ceramic matrix 43 of the tube-like wall 23, embedded in the cavities 46 therein and disposed on the electrically conductive layers 52. In addition, the cathode material 56 is disposed on the electrically conductive layers 52A and is built up away from another boundary defined by the first curved dashed line 28' up to and defining an internal facing porous base surface 28A. The cathode material 56 is embedded in the cavities up to the external surface 32. The porous ceramic matrix 43 within the tube-like wall 23, the diffusion barriers 48A, the diffusion barriers 48 within the tube-like wall 23, the electrically conductive layers 52 and 52A, and the cathode material 56, define a composite cathode 58. In one embodiment the cathode material 56 is lanthanum strontium manganate (LSM). In another embodiment, the cathode material 56 is $Ce_{0.9}Gd_{0.1}O_2$. In one embodiment the cathode material 56 is micro-structured. In one embodiment the cathode material 56 is nano-structured, for example nano-porous. In one embodiment, the cathode material 56 has voids 59 therein which consume about 15 percent to about 25 percent, by volume, of the cathode material. The composite cathode 58 is positively charged and collects and transports ions and electrons for use in producing electrical current by an electro-chemical reaction. While the cathode material 56 is said to be is built up away from the other boundary defined by the first curved dashed line 28' up to the internal facing porous base surface 28A, the present invention is not limited in this regard as other configurations are also contemplated, including but not limited to building up the cathode material to the boundary defined by the first curved dashed line 28' and any other position between the boundary defined by the first curved dashed line 28' and the internal facing porous base surface 28A.

FIG. 13 further illustrates an electrolyte layer 60 formed on the internal facing porous base surface 28A. In one embodiment, the electrolyte layer 60 is yttria-stabilized zirconia (YSZ). The electrolyte layer 60 is impervious to the transport of the fuel and the oxygen, but allows transport of oxygen ions therethrough in support of the electrochemical reaction. In one embodiment, the electrolyte layer has a porosity of less than about two percent. In one embodiment, the electrolyte layer 60 is relatively thin measuring about 1 micron to about 5 microns to minimize voltage drop across the electrolyte layer. In one embodiment a portion of the electrically conductive nano-particles 54 diffuse into the cathode material 56 for enhanced electrical conductivity of the composite cathode 58.

FIG. 13 also illustrates an anode layer 62 adhered to the electrolyte layer 60. Thus the electrolyte layer 60 is disposed between the anode layer 62 and the cathode material 56. The anode layer 62 includes the internal surface 28 which defines the first passage 30 in which fuel flows through. In one embodiment the anode layer 62 is nickel with YSZ (YSZ-Ni). In one embodiment the anode layer 62 is about 20 microns to about 60 microns thick. In one embodiment, the anode layer 62 has one of a nanocrystalline, a nanocomposite, and amorphous structure. The anode layer 62 is negatively charged. In one embodiment, the anode layer 62 is porous. In another embodiment, the anode layer 62 is nano-structured, for example nano-porous.

Figure 14:
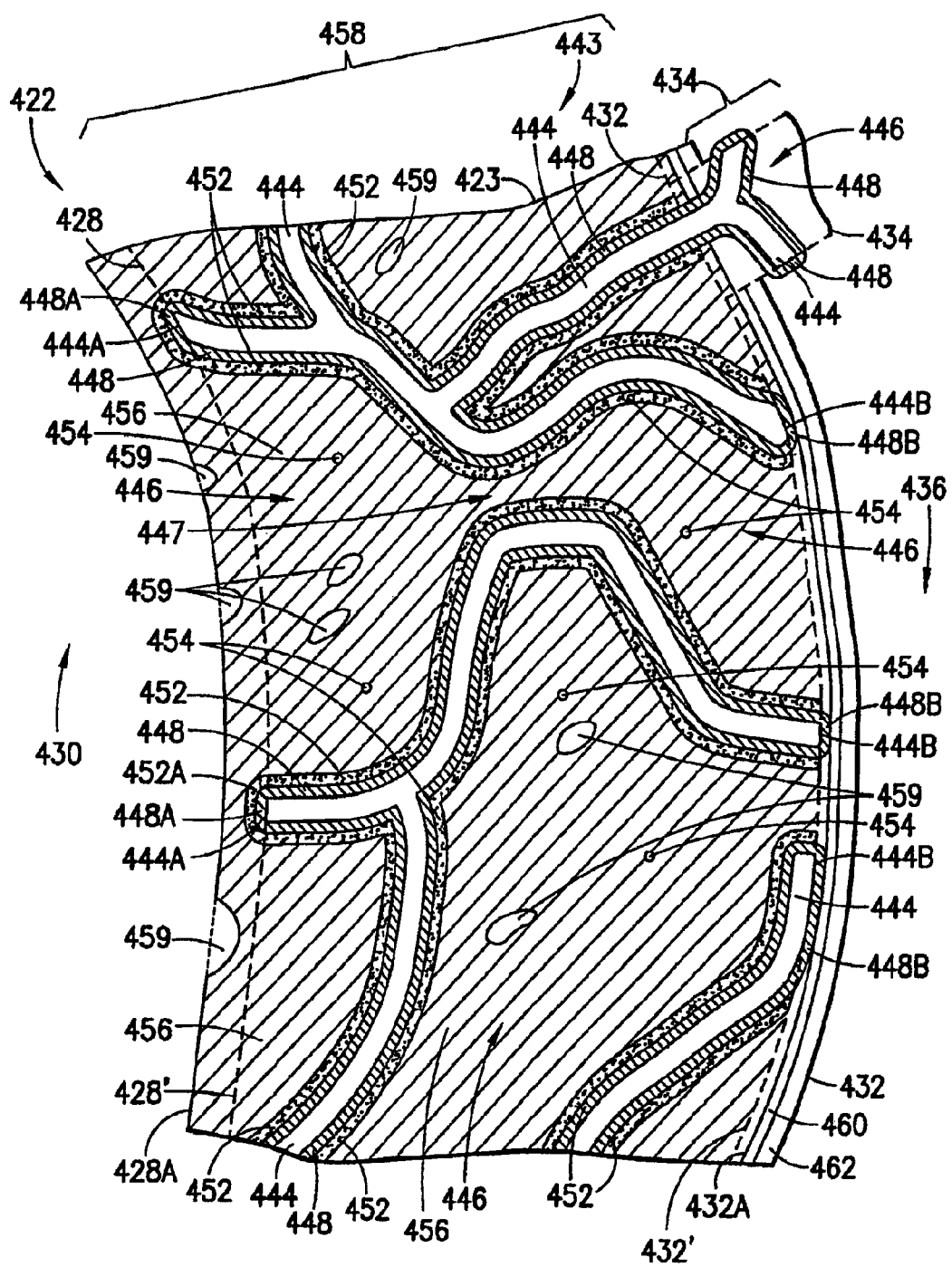
FIG. 14 is an illustration of the portion of the fluid conduit of FIG. 12 having a composite cathode, an electrolyte and an anode.

The fluid conduit of FIG. 14 is similar to that illustrated in FIGS. 12 and 13. Therefore, like elements will be given like numbers preceded by the numeral 4. FIG. 14 illustrates the cathode material 456 embedded in the porous ceramic matrix 443 of the tube-like wall 423 up to and thereby defining an external facing porous base wall 432A. An electrolyte layer 460 is adhered to the external facing porous base wall 432A and the diffusion bather 448B. An anode layer 462 is disposed on the electrolyte layer 460. Thus the electrolyte layer 460 is disposed between the anode layer 462 and the cathode material 456. The anode layer 462 includes the external surface 432 which in cooperation with the struts 434 defines the second passage 436. Thus during operation of this embodiment, the oxygen flows through the first passage 430 and the fuel flows through the second passage 436.

Figure 15:
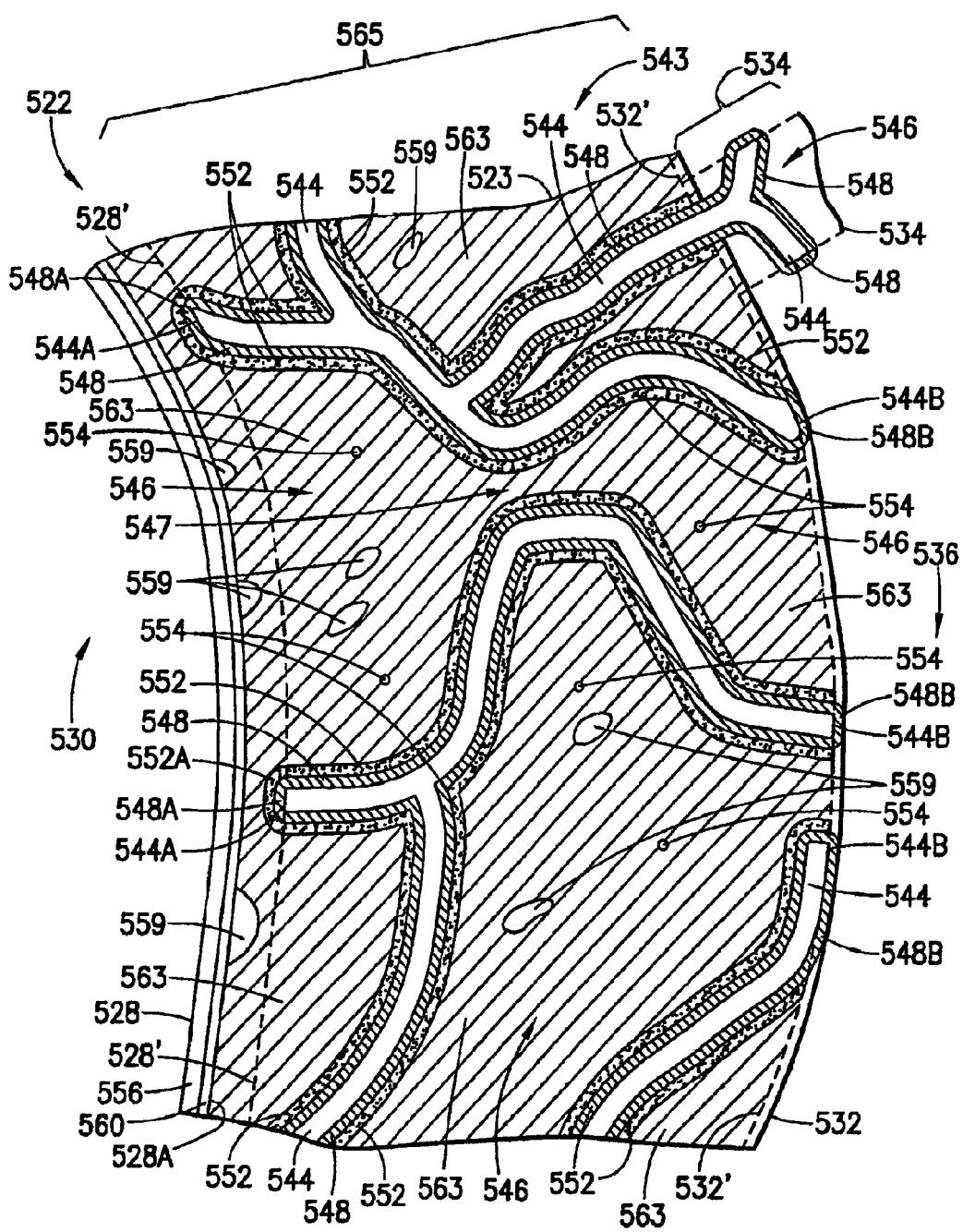
FIG. 15 is an illustration of the portion of the fluid conduit of FIG. 12 having a composite anode, an electrolyte and a cathode.

The fluid conduit of FIG. 15 is similar to that illustrated in FIGS. 12 and 13. Therefore, like elements will be given like numbers preceded by the numeral 5. Referring to FIG. 15, the porous ceramic matrix of the fluid conduit 522 is indicated by element number 543. The porous ceramic matrix 543 includes a labyrinth of walls 544 interconnected to one another and defining a plurality of cavities 546 therebetween. Still referring to FIG. 15, the porous ceramic matrix 543 includes diffusion barriers 548, 548A and 548B similar to that discussed above. In addition, the fluid conduit 522 has electrically conductive layers 552 and 552A of electrically conductive nano-particles applied to the diffusion barriers 548 and 548A, respectively. The electrically conductive layers 552 and 552A are about 5 nm to about 50 nm thick.

FIG. 15 also illustrates an anode material 563 embedded in the cavities 546 of the porous ceramic matrix 543 of the tube-like wall 523. The anode material 563 is also disposed on the electrically conductive layers 552 and 552A. In addition the anode material 563 is built up away from a boundary defined by the first curved dashed line 528' up to and defining an internal facing porous base surface 528A. The anode material 563 is embedded in the cavities 546 up to the external surface 532. The porous ceramic matrix 543 within the tube-like wall 523, the diffusion barriers 548A, the diffusion barriers 548 within the tube-like wall 523, the electrically conductive layers 552 and 552A, and the anode material 563, define a composite anode 565. In one embodiment, the anode material 563 is YSZ-Ni. In one embodiment, the anode material 563 has voids 559 therein which consume about 15 percent to about 25 percent, by volume, of the anode material. In one embodiment, a portion of the electrically conductive nano-particles 554 diffuse into the anode material 563 for enhanced electrical conductivity of the composite anode 565.

FIG. 15 further illustrates an electrolyte layer 560 formed on the internal facing porous base surface 528A. In one embodiment, the electrolyte layer 560 is YSZ. FIG. 15 also illustrates a layer of cathode material 556 adhered to the electrolyte layer 560. In one embodiment, cathode material 556 is LSM. The electrolyte layer 560 is disposed between the anode material 563 and the cathode material 556. The layer of cathode material 556 includes the internal surface 528 which defines the first passage 530. Thus during operation of this embodiment, the oxygen flows through the first passage 530 and the fuel flows through the second passage 536.

Figure 16:
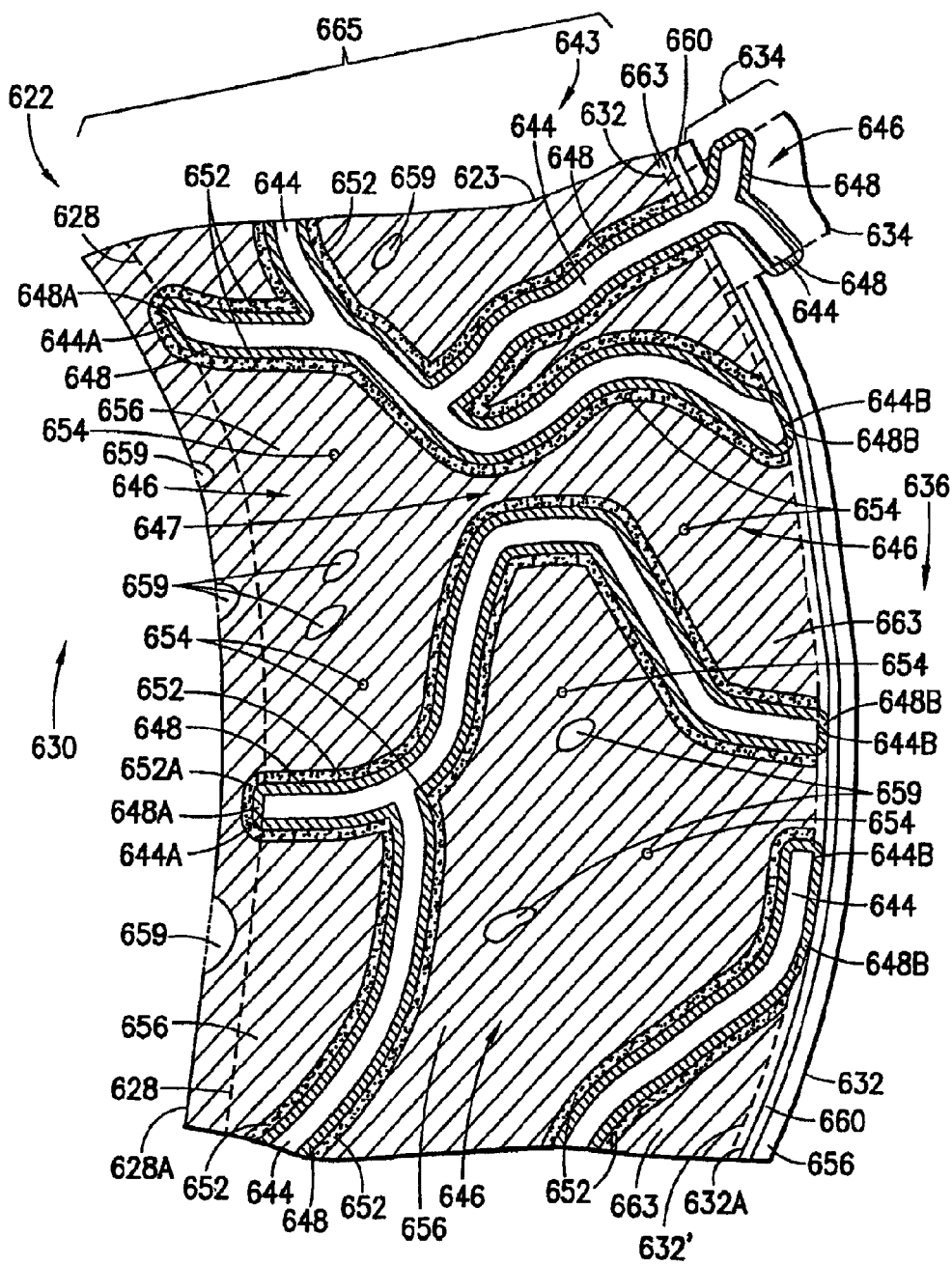
FIG. 16 is an illustration of the portion of the fluid conduit of FIG. 12 having a composite anode, an electrolyte and a cathode.

The fluid conduit of FIG. 16 is similar to the fluid conduit of FIGS. 12 and 13. Therefore, like elements will be given like numbers preceded by the numeral 6. In addition, FIG. 16 is similar to FIG. 15, except for positioning of the electrolyte layer 660 and the cathode material 656. In particular, FIG. 16 illustrates the anode material 663 embedded in the porous ceramic matrix 643 of the tube-like wall 623 up to and thereby defining an external facing base wall 632A. An electrolyte layer 660 is formed on the external facing base wall 632A and the diffusion bather 648B. A cathode layer 656 is adhered to the electrolyte layer 660. The cathode layer 656 includes the external surface 632 which, in combination with the struts 634, defines the second passage 636. Thus during operation of this embodiment, the fuel flows through the first passage 630 and the oxygen flows through the second passage 636.

The fluid conduit of FIG. 17 is similar to that illustrated in FIG. 12. Therefore, like elements will be given like numbers preceded by the numeral 7. The present invention is also adaptable to incorporating nanostructured ceramics produced by metastable processing including nanocrystalline, nanocomposite and amorphous, as described in U.S. Patent Application Publication No. 2005/0244693 to Strutt and Kear (hereinafter Publication No. 2005/0244693). In particular, intermeshing or compositional-grading of the cathode layer 758 and the anode layer 762 with the electrolyte layer 760 to facilitate oxygen-ion transport can be applied to the fluid conduit 722 described above. As indicated in Publication No. 2005/0244693, in a graded structure, a YSZ electrolyte extends finger-like into the electrode materials. In the present invention, electrolyte fingers 791 project from the electrolyte layer 760 into the anode layer 762 and into the cathode material 756; anode fingers 793 project from the anode layer 762 into the electrolyte layer 760; and cathode fingers 795 project from the cathode material 756 into the electrolyte layer 760. Thus, $O^{2-}$ ions formed by catalytic decomposition of the incoming oxygen (air) within the cathode layer 758 are efficiently delivered to the impervious electrolyte 760. In turn, the electrolyte layer 760 delivers the $O^{2-}$ ions to the anode layer 762, where efficient oxidation of fuel-decomposition products occurs. In one embodiment the anode layer 762 is a 20 to 60 micron thick layer of the nanocrystalline, nanocomposite and amorphous material supported by the electrolyte layer 760. In one embodiment, the anode layer 762 is porous and in another embodiment the electrolyte layer is nanoporous.

FIG. 18 illustrates a female manifold interconnect strip 70 having four female sockets 71 projecting therefrom, for parallel electrical connection of the composite cathode 58 thereto. For illustration purposes, three fluid conduits 22 are shown with inlet ends 24 inserted into the female sockets 71 and one fluid conduit disconnected from its respective female connector. In practice, all four of the fluid conduits 22 are connected to one another by the struts 34 and all four of the inlet ends 24 are inserted into the respective female sockets 71 and are secured therein by brazing.

FIG. 19 illustrates a male manifold interconnect strip 72 having four male sockets 73 projecting therefrom for parallel electrical connection of the anodes layer 62 thereto. For illustration purposes, three fluid conduits 22 are shown with the inlet ends 24 fitted over the male sockets 73 and one fluid conduit disconnected from its respective male connector. As mentioned above, all four of the fluid conduits 22 are connected to one another by the struts 34, thus all four of the inlet ends 24 are fitted over the respective male sockets 71 and are secured thereon by brazing.

As illustrated in FIG. 20, the inlet ends 24 are spaced away from the male manifold interconnect strip 72, when fitted over the male socket 73, by a gap G to prevent short circuiting of the anode layer 62 and composite cathode 58. A similar gap is used on the outlet ends 26 which are connected to the male manifold interconnect strips 72. While a gap G is described for preventing the short circuiting, the present invention is not limited in this regard as other arrangements are also suitable, including but not limited to use of an insulating spacer (not shown) inserted between the male manifold interconnect strip 72 and the inlet end 24 and/or the outlet end 26, accordingly and beveling (not shown) of the cathode 58 away from the inlet end 24 and/or the outlet end 26, accordingly.

FIG. 21 illustrates a manifold assembly 74 having a cover 76 and a housing 78. The cover 76 includes a connector 77 for flowing a fluid therethrough and into the housing 78. The housing 78 is shown with one of the female manifold interconnect strips 70 and one of the male manifold interconnect strips 72 disposed on a mounting surface 79 thereof. The manifold assembly 74 can accommodate an array having two rows of four fluid conduits for a total of eight fluid conduits. A portion of the housing 78 is cut away, only to illustrate the female manifold interconnect strip 70. A positive busbar 80 is in electrically conductive communication with the male manifold interconnect strips 72 and thus the composite cathode 58. The positive busbar 80 penetrates a sealed opening 82 in the housing 78 for connection to an external load (not shown). A second busbar 84 connects the male manifold interconnect strip 72 in electrical series with the female manifold interconnect strip 70. Although the manifold assembly 74 is described as accommodating two rows of four conduits, the present invention is not limited in this regard as any number of fluid conduits may be accommodated in any electrical configuration.

The female manifold interconnect strips 70 and the male manifold interconnect strips 72 are manufactured by welding the female sockets 71 and the male sockets 73 into the respective interconnect strips. In one embodiment, the female manifold interconnect strips 70 and the male manifold interconnect strips 72 are manufactured by powder metallurgy forming In order to improve material compatibility with the arrays 20 and to improve thermal shock resistance, in one embodiment the female manifold interconnect strips 70, the male manifold interconnect strips 72 and the housing 78 are manufactured from a zero, or near-zero coefficient of expansion material, such as Invar or cordierite. In one embodiment, the female manifold interconnect strips 70, the male manifold interconnect strips 72 and the housing 78 are coated with a material impervious to the passage of fuel and oxygen.

Figure 22:
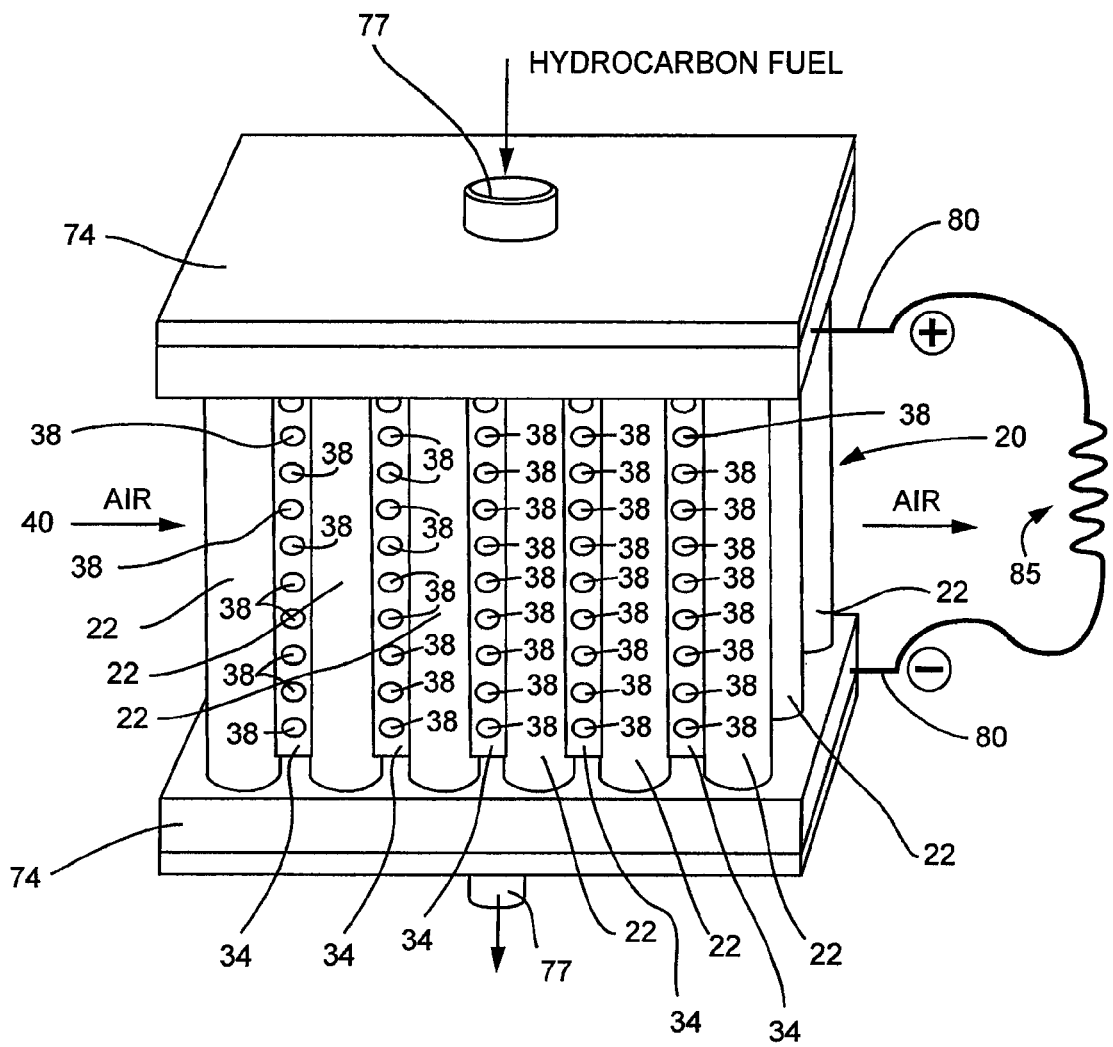
FIG. 22 is a perspective view of a solid oxide fuel cell assembly.

Referring to FIG. 22, the array 20 is shown sealed on opposing ends by the manifolds 74 and 74' thereby forming a SOFC. The manifold 74 includes the positive busbar 80 while the manifold 74' includes a negative busbar 80'. The positive busbar 80 and the negative busbar 80' are connected to an external load 85. During operation, fuel is injected through connector 77 which is forced through the manifold 74, into the first passages 30 (illustrated in FIG. 4), into the manifold 74' where unused fuel and fuel byproducts exhaust through the connector 77'. In addition, oxygen is fed through some of the ports 38, into the second passages 36 (illustrated in FIG. 4), and out through another set of the ports 38, as indicated by the arrow 40. The SOFC electrochemically processes the fuel and oxygen to generate an electrical current for consumption by the external load 85.

The present invention also includes a method for making an array of fluid conduits for a SOFC; in particular a method for making a porous ceramic matrix having porosity in the amount of about 50 percent to about 70 percent, by volume is disclosed. The method includes the step of providing a die for forming the array of the fluid conduits having tube-like walls. The die is configured to provide each of the fluid conduits with an external surface with a plurality of struts projecting outwardly therefrom and an internal surface defining a first passage therethrough. The method includes the step of providing a suspension of a solid oxide nanopowder, a surfactant, a monomer and a gelation agent such as a polymeric binder. The method further includes the steps of mixing the suspension to create a plurality of voids therein suitable for forming the porous ceramic matrix having the porosity in the amount of about 50 percent to about 70 percent, extruding the suspension through the die to form an intermediate state or phase of the porous ceramic matrix having a labyrinth of reinforcing walls defining a plurality of interconnecting cavities. The porous ceramic matrix is an electrical insulator. The fluid conduits are extruded from the die such that the fluid conduits are connected to one another by the struts and the struts and the external surface define a second passage. The intermediate state is then air dried and subsequently heated to about 500 degrees Celsius to about 1000 degrees Celsius to form a three dimensional array of multiple rows of fluid conduits of a sintered solid porous ceramic matrix.

The above method further includes the steps of providing a slurry or colloidal suspension of diffusion inhibiting nanoparticles, for example alumina, zirconia and titania, wash coating the internal surface, the external surface, the intermediate state including the labyrinth of reinforcing walls and the plurality of interconnecting cavities, and the struts, with the slurry or colloidal suspension of diffusion inhibiting nanoparticles to form a diffusion barrier thereon; and heating the array of the fluid conduits to about 500 degrees Celsius to about 1000 degrees Celsius.

The method also includes the steps of providing a slurry of electrically conductive nanoparticles, injecting the slurry of electrically conductive nanoparticles into the first passages and through the internal surfaces and into the cavities until the slurry of electrically conductive nanoparticles emerges at the external surfaces, without infiltrating the struts. The array is then dried and subsequently heated to about 200 degrees Celsius to about 300 degrees Celsius to sinter the electrically conductive nanoparticles and form an electrically conductive coating throughout the porous ceramic matrix within the tube-like walls. However, the struts remain uninfiltrated by the electrically conductive nanoparticles and thus are an electrical insulator providing electrical insulation between the fluid conduits.

The present invention also includes a method for making an array of fluid conduits for a SOFC having the cathode exposed on the external surface thereof. The method includes the step of providing a cathode material suspension or slurry, such as a suspension of nanostructured multi-oxide cathode material particles, for example LSM or $Ce_{0.9}Gd_{0.1}O_2$. An aqueous slurry or colloidal suspension of electrolyte material, such as YSZ, and an aqueous slurry or colloidal suspension of an anode material, such as Ni-YSZ is also provided. The cathode material suspension is injected into the internal passages, through the internal surfaces, and into the cavities, unimpeded by the electrically conductive nanoparticles, at a sufficient pressure and for a sufficient time to allow the cathode material suspension to emerge at the external surfaces, to form a sintered composite cathode. Infiltration rates of the cathode material suspension into the porous ceramic matrix increase with increasing pressure and decreasing size of the nanostructured multi-oxide cathode material particles. The array is then dried. Next, the internal surfaces are coated with a 2 to 10 micron thick layer of the suspension of electrolyte material to form an electrolyte layer therein. The electrolyte layer is formed by injecting the suspension of electrolyte material and a pressurized inert gas into the internal passages, causing the electrolyte material to be embedded approximately 2-25 microns into the composite cathode. In one embodiment, the electrolyte material is embedded approximately 2-5 microns into the composite cathode. The array is then dried. The electrolyte layer is then coated with the suspension of the anode material, to form an internally disposed anode layer of about 20 to 100 microns thick on the electrolyte layer. The array is then heated to about 500 degrees Celsius to about 1000 degrees Celsius. In one embodiment the array is heated in a reductive atmosphere with a partial pressure of hydrogen. In one embodiment, an internal gas pressure of about two atmospheres is applied to the internal surfaces of the fluid conduit to facilitate bonding of the electrolyte layer to the anode layer and the cathode material.

As an the alternative to the method of the preceding paragraph, the present invention also includes a method for making an array of fluid conduits for a SOFC having the anode exposed on the external surface thereof. Similar to the preceding paragraph, the method also includes the step of providing a cathode material suspension, such as a suspension of nanostructured multi-oxide, LSM and $Ce_{0.9}Gd_{0.1}O_2$. A suspension of electrolyte material, such as a suspension of YSZ, and suspension of an anode material, such as a suspension of Ni-YSZ, is also provided. However, the suspension of an anode material is injected into the internal passages, through the internal surfaces, and into the cavities, unimpeded by the electrically conductive nanoparticles, at a sufficient pressure and for a sufficient time to allow the suspension of an anode material to emerge at the external surfaces, to form a sintered composite anode. The array is then dried. Next, the internal surfaces are coated with a 2 to 10 micron thick layer of the suspension of electrolyte material to form an electrolyte layer therein. The electrolyte layer is formed by injecting the suspension of electrolyte material and a pressurized inert gas into the internal passages, causing the electrolyte material to be embedded approximately 2-25 microns into the composite anode. In one embodiment, the electrolyte material is embedded approximately 2-5 microns into the composite anode. The array is then dried. The electrolyte layer is then coated with the cathode material suspension, to form an internally disposed cathode layer. The array is then heated to about 500 degrees Celsius to about 1000 degrees Celsius. In one embodiment the array is heated in a reductive atmosphere with a partial pressure of hydrogen.

Although the present invention has been disclosed and described with reference to certain embodiments thereof, it should be noted that other variations and modifications may be made, and it is intended that the following claims cover the variations and modifications within the true scope of the invention.

What is claimed is:

1. An assembly for a solid oxide fuel cell, said assembly comprising:
    a porous ceramic oxide matrix having a labyrinth of reinforcing walls;
    an array of fluid conduits, each of said fluid conduits comprising said porous ceramic oxide matrix and having an external surface with a plurality of struts projecting outwardly therefrom and an internal surface defining a first passage for flowing a first fluid therethrough;
    said struts being configured to connect said fluid conduits to one another; and
    said external surfaces and said struts defining a second passage around said fluid conduits for flowing a second fluid therethrough,
    wherein said reinforcing walls have a diffusion barrier coated thereon for inhibiting migration of atoms from said porous ceramic oxide matrix,
    wherein a portion of said diffusion barrier has an electrically conductive coating applied thereto and said struts electrically insulate said fluid conduits from one another; and
    wherein said porous ceramic oxide matrix has a coefficient of thermal expansion of about zero to about $3 \times 10^{-6}/°K$.

2. The assembly of claim 1, wherein said reinforcing walls define a plurality of cavities therebetween, each of said fluid conduits comprise a cathode material embedded in at least a portion of said cavities thereby forming a composite cathode, an electrolyte layer formed on said composite cathode and an anode layer formed on said electrolyte layer.

3. The assembly of claim 1, wherein said reinforcing walls define a plurality of cavities therebetween, each of said fluid conduits comprise an anode material embedded in at least a portion of said cavities thereby forming a composite anode, an electrolyte layer formed on said composite anode and a cathode layer formed on said electrolyte layer.

4. The assembly of claim 1, wherein said struts have a plurality of ports therein.

5. The assembly of claim 1, wherein said porous ceramic oxide matrix has a porosity of about 50 percent to about 70 percent.

6. The assembly of claim 1, wherein said porous ceramic oxide matrix is one of a nanocrystalline, a nanocomposite, and an amorphous structure.

7. The assembly of claim 2, wherein said array of fluid conduits has a manifold mounted on opposing ends thereof, said manifolds each being in fluid communication with said first passages for channeling said first fluid therethrough and said manifolds being in electrically conductive communication with each of said fluid conduits.

8. The assembly of claim 3, wherein said array of fluid conduits has a manifold mounted on opposing ends thereof, said manifolds each being in fluid communication with said first passages for channeling said first fluid therethrough and said manifolds being in electrically conductive communication with each of said fluid conduits.

9. The assembly of claim 2, wherein said electrolyte layer has a porosity of less than about 2 percent and is about 1 micron to about 5 microns thick.

10. The assembly of claim 3, wherein said electrolyte layer has a porosity of less than about 2 percent and is about 1 micron to about 5 microns thick.

11. The assembly of claim 2, wherein said anode layer is about 20 microns to about 60 microns thick and has one of a nanocrystalline, a nanocomposite, and amorphous structure.

12. The assembly of claim 3, wherein said anode layer is about 20 microns to about 60 microns thick and has one of a nanocrystalline, a nanocomposite, and amorphous structure.

* * * * *